United States Patent
Lipke et al.

(10) Patent No.: US 10,151,890 B2
(45) Date of Patent: Dec. 11, 2018

(54) DATA COMMUNICATION PORT INSERT CONFIGURABLE WITH INDICIA TO CUSTOMIZE DATA COMMUNICATION STATION LABELING AND IDENTIFICATION

(71) Applicant: Leviton Manufacturing Co., Inc., Melville, NY (US)

(72) Inventors: Dean Lipke, Mill Creek, WA (US); Jennifer Yanni, Seattle, WA (US); William Lauby, Mukilteo, WA (US); Charles Bragg, Bothell, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/070,578

(22) Filed: Mar. 15, 2016

(65) Prior Publication Data

US 2016/0276779 A1    Sep. 22, 2016

Related U.S. Application Data

(60) Provisional application No. 62/134,905, filed on Mar. 18, 2015.

(51) Int. Cl.
*G02B 6/00* (2006.01)
*G02B 6/38* (2006.01)
(Continued)

(52) U.S. Cl.
CPC .......... *G02B 6/3895* (2013.01); *H01R 13/465* (2013.01); *H01R 24/64* (2013.01)

(58) Field of Classification Search
CPC .. H01R 9/2475; H01R 6/2683; H01R 13/465; H01R 24/64
(Continued)

(56) References Cited

U.S. PATENT DOCUMENTS 1,930,610 A    10/1933  Despard
1,975,690 A *  10/1934  Harrington ............. G09F 13/06
                                                    174/66
(Continued)

FOREIGN PATENT DOCUMENTS

EP    2400775     12/2011
JP    05033412    4/1993
(Continued)

OTHER PUBLICATIONS

"Structured Cabling Systems", The Industry's Premier Line of Wiring Devices, L-101, Section L, pp. L2-L66, Leviton.
(Continued)

*Primary Examiner* — Ryan Lepisto
*Assistant Examiner* — Guy Anderson
(74) *Attorney, Agent, or Firm* — Leviton Manufacturing Co., Inc.

(57) ABSTRACT

An exemplary embodiment of a device, configurable with various indicia of connectivity, and to be received by a data communication station is disclosed. The data communication station may include a frame having an aperture formed therein and a blank insert configured to be in registered alignment with the aperture. The blank insert may include a front facing surface configured to receive indicia thereon. The blank insert may include a retention feature configured to engage with an identification icon. In another embodiment, the data communication station may include a frame, a connector housing insert, and an identification icon configured to receive connectivity indicia thereon, wherein the connector housing insert may include a retention feature to engage with a corresponding retention feature on the identification icon. In another embodiment, a data communication station is configured to directly receive and retain an
(Continued)

identification icon configured to receive connectivity indicia thereon.

10 Claims, 13 Drawing Sheets

(51) Int. Cl.
*H01R 13/46* (2006.01)
*H01R 24/64* (2011.01)

(58) Field of Classification Search
USPC .......................................................... 385/134
See application file for complete search history.

(56) References Cited

U.S. PATENT DOCUMENTS

| | | | |
|---|---|---|---|
| 2,431,999 A | | 12/1947 | Engelhardt |
| 2,515,820 A | | 7/1950 | Clark |
| 2,549,419 A | | 4/1951 | Callahan |
| 2,625,759 A | | 1/1953 | Koepke |
| 2,710,382 A | * | 6/1955 | Fitzpatrick ......... H01R 13/4534 174/67 |
| 3,438,536 A | | 4/1969 | Tarchalski |
| 3,989,338 A | | 11/1976 | Gosser |
| 4,282,591 A | | 8/1981 | Andreuccetti |
| 4,293,173 A | * | 10/1981 | Tricca ................. H01R 13/443 174/67 |
| 4,479,317 A | | 10/1984 | Hanna |
| 4,707,564 A | | 11/1987 | Gonzales |
| 4,743,206 A | * | 5/1988 | Imhoff ................ H01R 13/447 174/67 |
| 4,780,573 A | | 10/1988 | Own |
| 4,820,193 A | | 4/1989 | Noorily |
| 5,051,870 A | | 9/1991 | Companion |
| 5,106,325 A | | 4/1992 | Robinson et al. |
| 5,156,551 A | | 10/1992 | Unger et al. |
| 5,212,899 A | | 5/1993 | Fandreyer |
| 5,284,363 A | | 2/1994 | Gartner et al. |
| 5,290,175 A | | 3/1994 | Robinson et al. |
| 5,362,254 A | | 11/1994 | Siemon et al. |
| 5,380,045 A | | 1/1995 | Comann |
| 5,401,193 A | | 3/1995 | Lo Cicero et al. |
| D359,475 S | | 6/1995 | Coffey |
| D366,025 S | | 1/1996 | Siernon et al. |
| 5,538,438 A | | 7/1996 | Orlando |
| 5,575,665 A | | 11/1996 | Shramawick et al. |
| 5,594,206 A | | 1/1997 | Klas et al. |
| 5,611,691 A | | 3/1997 | Poulain |
| 5,613,874 A | * | 3/1997 | Orlando ............... H01R 13/465 40/607.13 |
| 5,632,648 A | | 5/1997 | Liu |
| 5,675,125 A | | 10/1997 | Hollinger |
| 5,765,698 A | | 6/1998 | Bullivant |
| 5,836,786 A | | 11/1998 | Pepe |
| D411,514 S | | 6/1999 | Tulley |
| D411,515 S | | 6/1999 | Tulley |
| 5,975,962 A | | 11/1999 | Laukonis |
| 5,983,539 A | | 11/1999 | Martin et al. |
| 6,017,229 A | | 1/2000 | Tulley et al. |
| 6,026,605 A | | 2/2000 | Tippett |
| 6,053,764 A | | 4/2000 | Curry et al. |
| 6,086,415 A | | 7/2000 | Sanchez et al. |
| 6,135,505 A | | 10/2000 | Fendt et al. |
| 6,172,301 B1 | | 1/2001 | Goodsell |
| 6,215,067 B1 | | 4/2001 | Chen |
| 6,245,998 B1 | | 6/2001 | Curry et al. |
| 6,282,826 B1 | | 9/2001 | Richards |
| 6,305,950 B1 | | 10/2001 | Doorhy |
| 6,332,795 B1 | | 12/2001 | Conorich |
| 6,337,836 B1 | | 1/2002 | Eidelson |
| 6,347,715 B1 | | 2/2002 | Drozdenko et al. |
| 6,358,080 B1 | | 3/2002 | Conorich |
| 6,371,793 B1 | | 4/2002 | Doorhy et al. |
| 6,416,339 B1 | | 7/2002 | Snow et al. |
| 6,421,941 B1 | | 7/2002 | Finke et al. |
| 6,461,189 B1 | | 10/2002 | Koh |
| 6,478,611 B1 | | 11/2002 | Hyland |
| 6,496,884 B1 | | 12/2002 | Friesen |
| 6,520,544 B1 | | 2/2003 | Mitchell et al. |
| 6,642,452 B2 | | 11/2003 | Masson |
| 6,722,563 B1 | | 4/2004 | Johnson et al. |
| 6,752,431 B1 | | 6/2004 | Matthews et al. |
| 6,761,583 B2 | | 7/2004 | Ortowski et al. |
| 6,786,776 B2 | | 9/2004 | Itano et al. |
| 6,793,524 B2 | * | 9/2004 | Clark ................... H01R 13/518 439/536 |
| 6,814,624 B2 | | 11/2004 | Clark et al. |
| 6,814,625 B2 | * | 11/2004 | Richmond ......... H01R 13/6453 439/157 |
| 6,831,569 B2 | | 12/2004 | Wang |
| 6,974,352 B2 | | 12/2005 | Clark et al. |
| 7,112,090 B2 | | 9/2006 | Caveney et al. |
| 7,119,708 B2 | | 10/2006 | Newell |
| 7,161,556 B2 | | 1/2007 | Morgan et al. |
| 7,183,487 B1 | | 2/2007 | O'Young et al. |
| 7,211,163 B2 | | 5/2007 | Kennedy |
| 7,270,565 B2 | | 9/2007 | Kamata et al. |
| 7,279,637 B1 | | 10/2007 | O'Young et al. |
| D554,598 S | | 11/2007 | Laursen et al. |
| 7,306,492 B2 | | 12/2007 | Clark et al. |
| 7,335,056 B1 | | 2/2008 | Clark et al. |
| 7,343,078 B2 | | 3/2008 | Spisany et al. |
| 7,353,629 B2 | | 4/2008 | Caveney et al. |
| 7,357,249 B1 | | 4/2008 | Weber |
| 7,404,736 B2 | | 7/2008 | Herbst et al. |
| 7,424,785 B2 | * | 9/2008 | Feroli .................... G09F 3/18 361/679.55 |
| 7,427,204 B1 | * | 9/2008 | Mangone ............. H01R 13/443 439/148 |
| 7,488,205 B2 | | 2/2009 | Spisany et al. |
| 7,538,271 B2 | | 5/2009 | O'Young et al. |
| 7,547,227 B1 | | 6/2009 | Gibson et al. |
| 7,581,843 B2 | | 9/2009 | Stauner |
| 7,585,191 B2 | | 9/2009 | Hawley et al. |
| 7,641,513 B2 | | 1/2010 | Hoath et al. |
| 7,674,977 B1 | * | 3/2010 | Constantino ............. H02G 3/14 174/53 |
| D616,374 S | | 5/2010 | McNutt et al. |
| 7,709,072 B2 | | 5/2010 | Caveney et al. |
| 7,722,411 B2 | | 5/2010 | Merrow et al. |
| 7,740,282 B2 | * | 6/2010 | McNutt ................. H04Q 1/136 283/109 |
| 7,756,380 B2 | | 7/2010 | Ruiz et al. |
| 7,811,123 B2 | | 10/2010 | Hoath et al. |
| 7,934,948 B2 | | 5/2011 | Follingstad |
| 7,980,890 B2 | | 7/2011 | Gibson et al. |
| 8,028,452 B2 | * | 10/2011 | Laursen ............... H01R 13/518 174/66 |
| 8,141,224 B2 | | 3/2012 | Tabet |
| 8,157,582 B2 | | 4/2012 | Frey et al. |
| 8,221,157 B2 | * | 7/2012 | Zantout ................. H01R 9/2475 439/491 |
| 8,292,660 B2 | | 10/2012 | Allwood |
| 8,385,709 B2 | | 2/2013 | Hawley et al. |
| 8,391,663 B2 | | 3/2013 | Carter et al. |
| 8,544,892 B2 | | 10/2013 | McNutt et al. |
| 8,636,222 B2 | * | 1/2014 | Vanderwel ........... H01R 9/2475 235/492 |
| 8,827,739 B2 | * | 9/2014 | Hanses ................ H01R 4/4836 439/441 |
| 9,058,752 B2 | * | 6/2015 | Ganster ................ G09F 3/0295 |
| 9,196,977 B2 | * | 11/2015 | Perez, Jr. ............. H01R 9/2475 |
| 9,223,097 B2 | * | 12/2015 | Leigh ................... G02B 6/3879 |
| 2002/0194725 A1 | | 12/2002 | Perea, Jr. et al. |
| 2003/0124908 A1 | | 7/2003 | Chen |
| 2004/0026918 A1 | | 2/2004 | Piana |
| 2004/0154196 A1 | | 8/2004 | Miyake |
| 2004/0163837 A1 | | 8/2004 | Price |
| 2005/0057353 A1 | | 3/2005 | Barrieau et al. |
| 2006/0059757 A1 | * | 3/2006 | Didulo .................... G09F 3/207 40/737 |
| 2006/0084323 A1 | | 4/2006 | Clark et al. |

(56) References Cited

U.S. PATENT DOCUMENTS

| | | | |
|---|---|---|---|
| 2006/0150458 A1 | 7/2006 | Feroli et al. | |
| 2007/0121323 A1 | 5/2007 | Pawlik et al. | |
| 2007/0227053 A1 | 10/2007 | Miyake | |
| 2007/0238352 A1 | 10/2007 | Deng | |
| 2008/0090461 A1 | 4/2008 | Pepe et al. | |
| 2008/0096438 A1 | 4/2008 | Clark et al. | |
| 2008/0138573 A1* | 6/2008 | Caveney | G09F 3/20 428/131 |
| 2008/0159744 A1 | 7/2008 | Soto et al. | |
| 2008/0274640 A1* | 11/2008 | Siemon | H01R 13/6463 439/534 |
| 2008/0304804 A1* | 12/2008 | Zimmel | G02B 6/3849 385/139 |
| 2009/0053923 A1 | 2/2009 | Navarro et al. | |
| 2009/0194226 A1 | 8/2009 | Tabet | |
| 2010/0074588 A1* | 3/2010 | Zimmel | G02B 6/3849 385/139 |
| 2010/0095572 A1 | 4/2010 | Laursen et al. | |
| 2010/0099297 A1* | 4/2010 | Siemon | H01R 13/6469 439/536 |
| 2010/0322576 A1* | 12/2010 | Rhoney | G02B 6/4452 385/134 |
| 2011/0008996 A1* | 1/2011 | Pinn | H04Q 1/136 439/489 |
| 2011/0263151 A1* | 10/2011 | Wang | G02B 6/3893 439/350 |
| 2012/0289068 A1* | 11/2012 | Bodette | H01R 13/443 439/88 |
| 2014/0017934 A1* | 1/2014 | Schwarzkopf | H01R 4/4836 439/491 |
| 2015/0040447 A1* | 2/2015 | Ganster | G09F 3/0295 40/647 |

FOREIGN PATENT DOCUMENTS

| | | |
|---|---|---|
| JP | 10172362 | 6/1998 |
| JP | 2007174750 | 7/2007 |
| KR | 200283068 | 7/2002 |
| KR | 200422110 | 7/2006 |
| WO | PCT/US/2009061104 | 10/2009 |

OTHER PUBLICATIONS

Written Opinion dated Feb. 28, 2011, for International Patent Application No. PCT/US2010/038806 filed Jun. 16, 2010.

"SYSTIMAX GigaSPEED X10D Shielded High Density Information Outlet," Commscope, pp. 1-4, Jun. 6, 2014.

"AMP-Twist 6S SL Jack Rear Exit," TE Connectivity, p. 1, Nov. 4, 2004.

"Angled Stainless-Steel QuickPort(R) Wallplates with ID Windows," Leviton Manufacturing Co., Inc., p. 1-2, May 2014.

"Blank QuickPort Inserts," Leviton Manufacturing Co., Inc., p. 1-2, May 2014.

"e2XHD Label Kit," Leviton Manufacturing Co., Inc., p. 1, Jun. 2013.

"Wallplates, Wire, Cable, and Accessories," Leviton Manufacturing Co., Inc., 1993, pp. E6-E7. T100.

"Ortronics Open System Architecture," Ortronics, p. 1-5, Sep. 1992-1993.

"IMO Faceplates/Panel," Ortronics, Issue 1, 1992-93, 5 pages including pp. 23-24.

"Wall Plates," Hubbell, p. 1-3, Aug. 1998.

"CT Faceplates," Siemon, 4 pages, Jan. 2014.

"Product Environmental Profile Ortronics(R) Shielded 110 Terminated Jacks," Legrand, pp. 1-5, Sep. 2015.

"Shielded Copper Cabling System, Innovative Connectivity Solution for Maximum Performance and Security," Panduit, pp. 1-8, Nov. 2015.

"PowerCat 6A Shielded Jack," Molex, p. 1, 2012.

Systimax(R) Solutions GigaSPEED(R) x10D Shielded (F/UTP, S/FTP) Solution Guide, Commscope, pp. 1-12, Jun. 2011.

"Product Specifications 760163527, HFTP-J10G," Commscope pp. 1-2, Jan. 16, 2016.

"Z-MAX(R) 6A Shielded Outlets," Siemon, pp. 1-2, 2015.

"AMP-Twist 6S SL Jack Rear Cable Exit W/O Dust Cover," TE Connectivity, p. 1, Jul. 25, 2006.

Patent Cooperation Treaty International Search Report, dated Jul. 11, 2016, PCT/US2016/022592, 3 pages.

Patent Cooperation Treaty Written Opinion of the International Searching Authority, dated Jul. 11, 2016, PCT/US2016/022592, 5 pages.

\* cited by examiner

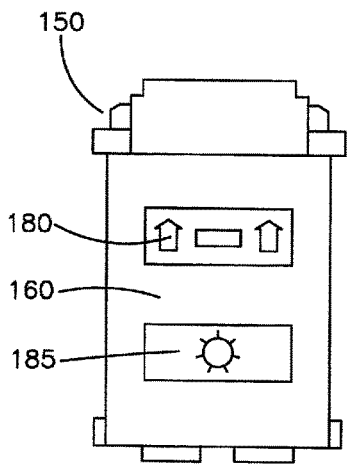
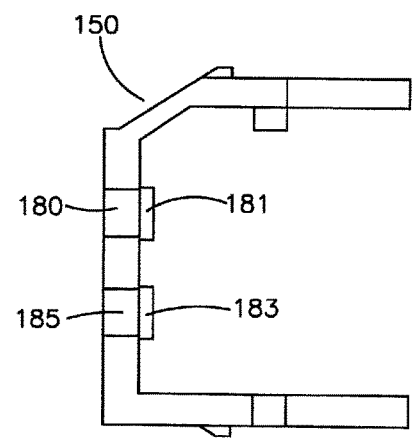
Fig.1C          Fig.1D
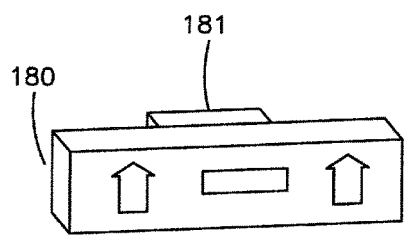
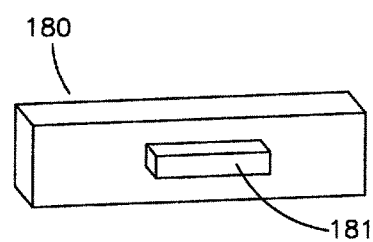
Fig.1E          Fig.1F

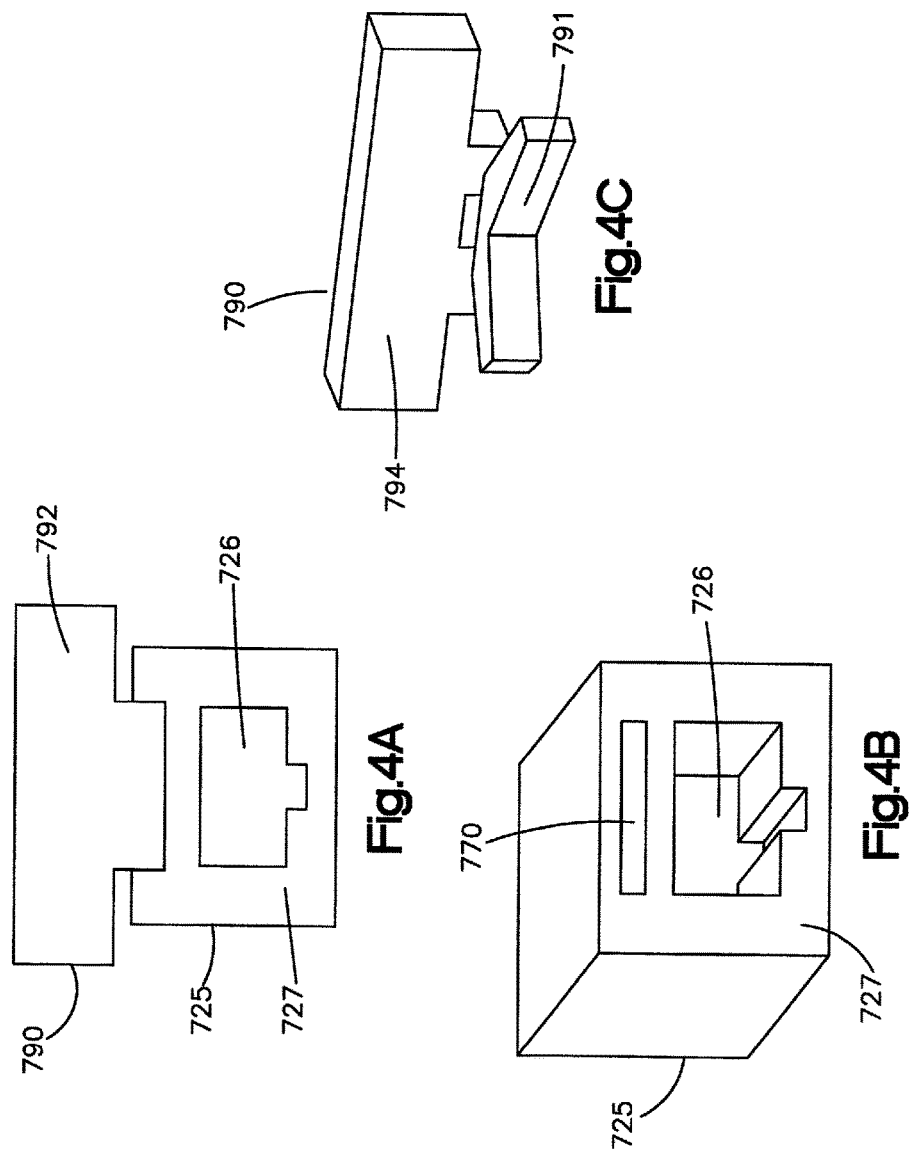

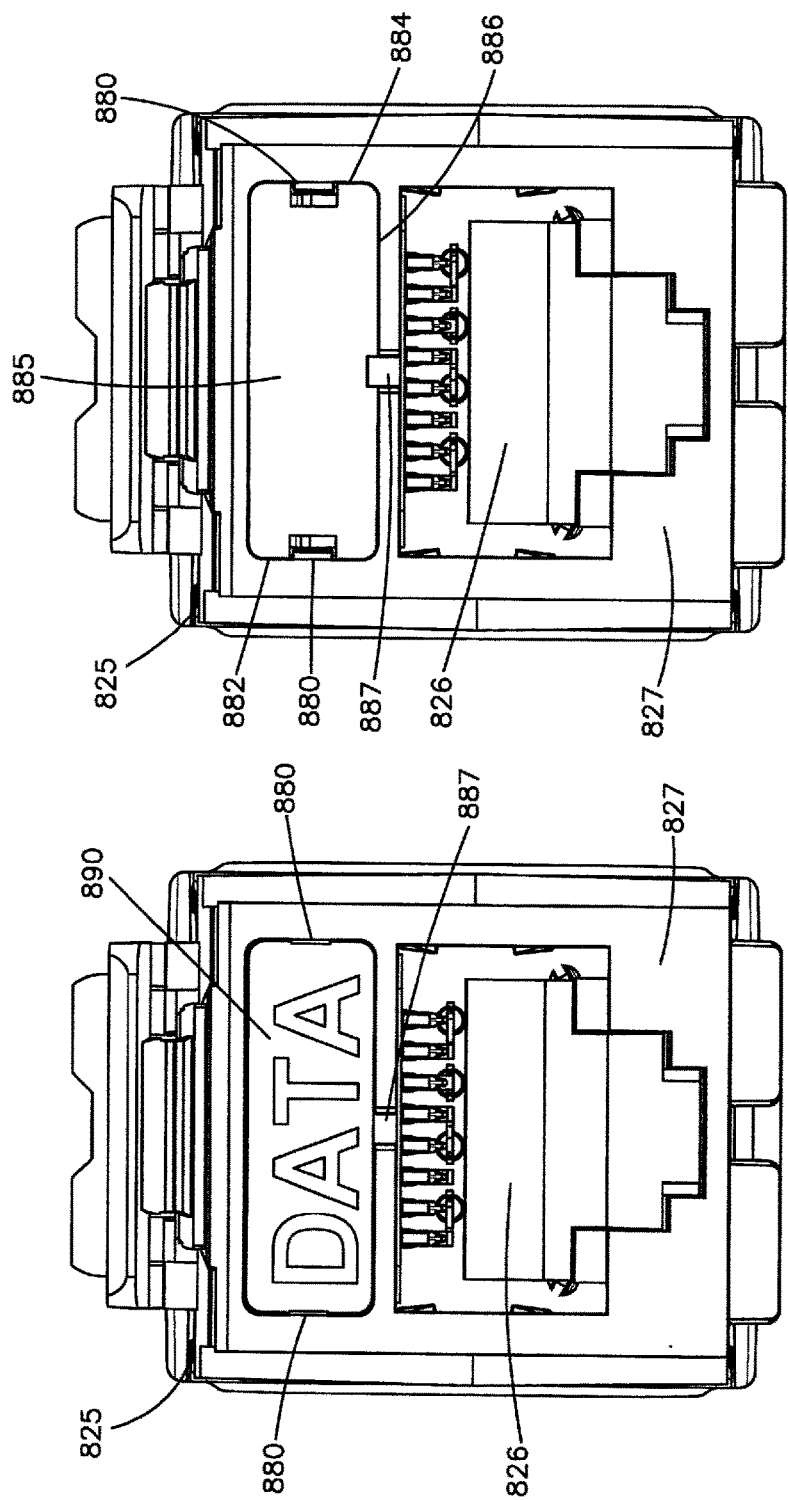

DATA COMMUNICATION PORT INSERT CONFIGURABLE WITH INDICIA TO CUSTOMIZE DATA COMMUNICATION STATION LABELING AND IDENTIFICATION

FIELD OF THE DISCLOSURE

The present disclosure relates generally to a device and method of use thereof to label and customize data communication stations, outlets and connectors, and more particularly, to a device, a blank insert or a connector housing insert, configured to receive customizable indicia, and to be inserted into a conventional outlet in a data communications station to thereby identify and specify connectors and outlets and to enhance the labeling and identification of connectivity for the data communication station.

DESCRIPTION OF THE RELATED ART

Connectivity interfaces, commonly known as, e.g., ports, connectors, sockets, outlets, jacks, adapters, plugs and the like, may be configured to receive a variety of connectors including, but not limited to, Registered Jacks (e.g. RJ-11, RJ-45 etc.), various category connectors (e.g. Category 6, Category 6A), S-Video adapters, F-Connectors, binding post connectors, banana jack connectors, stereo adapters, RCA connectors, BNC connectors, shielded connectors, universal serial bus (USB), high definition multimedia interface (HDMI), DisplayPort, fiber connectors, and the like, for the transmission of digital and analog voice, audio, video and data signals (collectively referred to herein generally as "connectors"), along various conductive media (e.g. copper wire, optical fiber) disposed within cabling. Data communication stations including, but not limited to, wall plates, patch panels, patch blocks, termination blocks, housings, etc., may include such connectivity interfaces configured to receive one or more of such connectors.

Typically, space is limited in data communication stations which can make it hard to keep track of the type of connectivity interface(s) configured to receive specific connector(s) within a particular data communication station as well as identification of the equipment or circuits to which specific cables are connected. Some existing data communication stations, such as wall plates, may have identification icons at the top or bottom front facing surfaces of the wall plate for general identification purposes, but the identification icons are not typically specific to individual connectors or connectivity interfaces.

SUMMARY OF THE DISCLOSURE

Within embodiments disclosed herein, a device, referred to herein as a blank insert or a connector housing insert, configurable to receive customizable indicia, may be inserted into a connectivity interface in a data communications station in lieu of a standard connector, e.g. a RJ-45 jack or a fiber optic adapter into which fiber optic connector are disposed, to thereby identify, label and specify, the respective connector, the respective connectivity interface and/or other connectors and connectivity interfaces in the data communication station to enhance the labeling and identification of connectivity for the data communication station. Such a blank insert or connector housing insert may be useful not only to identify connectivity parameters of connectors and connectivity interfaces in the data communication station, but may also be used as place holders to reserve space for future expansion of connectivity interfaces in the data communication station.

A method of assembling a data communication station is also disclosed. The method includes providing a blank insert or connector housing insert, inserting the blank insert or connector housing insert into a connectivity interface formed in a data communication station, selecting an identification icon configured to be received by the blank insert, connector housing insert or directly by the data communication station, and attaching the identification icon to the blank insert, connector housing insert or data communication station.

BRIEF DESCRIPTION OF THE SEVERAL VIEWS OF THE DRAWING(S)

One or more aspects of the disclosed subject matter are particularly pointed out and distinctly claimed as examples in the claims at the conclusion of the specification. The foregoing and other objects, features, and advantages of the disclosed subject matter may be more readily understood by one skilled in the art with reference being had to the following detailed description of several embodiments thereof, taken in conjunction with the accompanying drawings wherein like elements are designated by identical reference numerals throughout the several views, and in which:

FIG. 1C is a front view of the blank insert of FIG. 1A including first and second identification icons bearing various indicia of connectivity thereon and disposed in the first and second apertures of the blank insert;

FIG. 1D is a side view of the blank insert of FIG. 1C;

FIG. 1E is a front perspective view of the first identification icon of FIG. 1C, the first identification icon having a rearward-facing retention tab and bearing indicia of connectivity;

FIG. 1F is a rear perspective view of the first identification icon of FIG. 1E;

FIG. 4A is an exemplary embodiment of a connector housing insert and respective connectivity interface, the connector housing insert having an aperture formed therein configured to receive an indicia-bearing identification icon therein;

FIG. 4B is a front perspective view of the connector housing insert and respective connectivity interface of FIG. 4A;

FIG. 4C is a back perspective view of the identification icon of FIG. 4A;

FIG. 5A is another exemplary embodiment of a connector housing insert and respective connectivity interface, the connector housing insert having a recess formed therein configured to receive an indicia-bearing identification icon therein;

FIG. 5B is a front view of the connector housing insert and respective connectivity interface of FIG. 5A having the indicia-bearing identification icon removed;

Figure 7A:
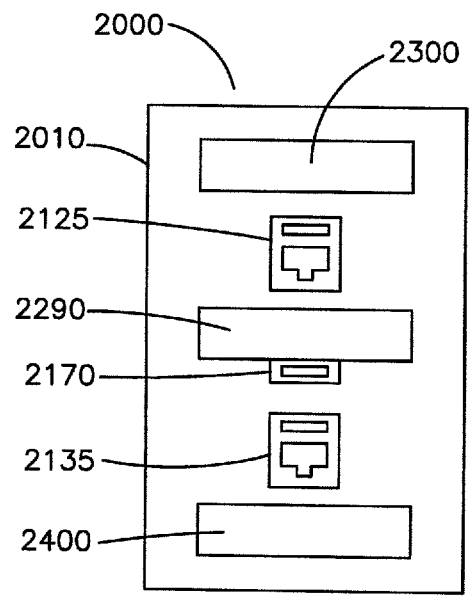
FIG. 7A is an exemplary embodiment of a data communication station configured to receive a plurality of identification icons into the apertures of the blank insert, the connector housing inserts, and/or the identification windows.
Figure 7B:
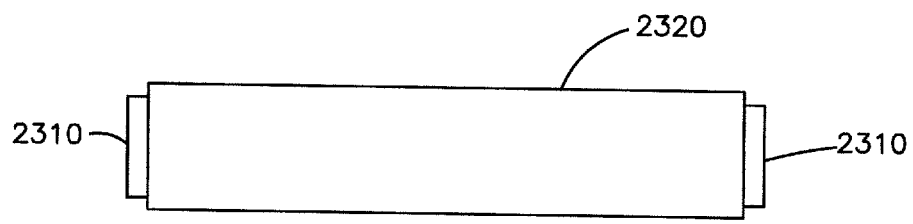
Figure 7C:
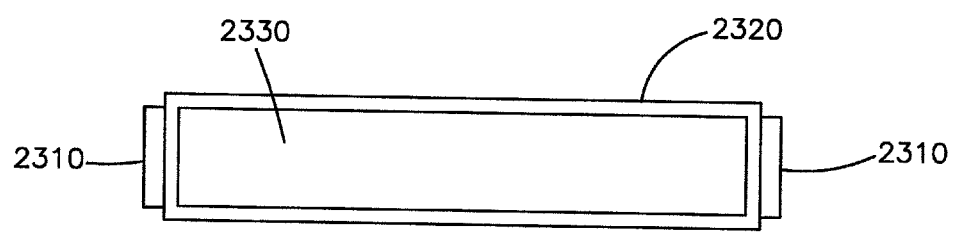

FIG. 7B is a front view of the identification window configured to retain various media (e.g. strips of paper, strips of plastic) upon which various indicia of connectivity may be disposed, the identification window having retention tabs configured to couple such identification window to the front facing surface of the data communication station of FIG. 7A; and FIG. 7C is a back view of the identification window of FIGS. 7A-B within which is disposed media (e.g. strips of paper; strips of plastic) upon which various indicia may be marked.

DETAILED DESCRIPTION

The present disclosure describes an apparatus, system and assembly for a blank insert or connector housing insert, configurable to receive connectivity indicia, and to be received in a data communication station for identifying connectivity information such as, but not limited to, the connectivity interface, the connector (e.g. RJ-45, HDMI, USB, etc.) and circuitry (e.g. connected devices, connected cabling, connected locations, etc.), etc. The disclosed blank insert, connector housing insert and data communication station provide the means to identify and label data communication stations, cables, connectivity interfaces, and the like. The term connectivity interface is used generally to include a port, a connector, a socket, an outlet, a jack, a plug, and the like, configured to receive a variety of connectors such as, but not limited to, USB, RJ-45, HMDI, F-connector, fiber connectors and the like.

Embodiments will be described below while referencing the accompanying figures. The accompanying figures are merely examples and are not intended to limit the scope of the present disclosure. As such, many of the embodiments show and describe a data communication station configured as a wall plate but, alternatively, these embodiments could be comprised of other data communication stations such as, but not limited to, patch panels, housings, racks or other types of supportive frames or framework and the like as is understood by one of ordinary skill in the art. As such, in alternative embodiments, other types of frames may be used besides a wall plate.

As will now be described, the system for identification and indicia disclosed herein provides for various types and sizes of identification icons and windows that may be attached variously, alone and in combination, to a blank insert 150, 250, 350, 2170 (see FIGS. 1A-D, 2A-D, 3A, 7A), a connector housing insert 725, 825, 2125, 2135 (see FIGS. 4A-C, 5A-H, 6A-D, 7A), and directly to a data communication station such as a wall plate 2010 (FIGS. 7A-C).

The blank insert 150, 250, 350, 2170 may include a front facing surface (e.g. 160 of blank insert 150 of FIG. 1A) configured to receive indicia or markings thereon. The blank insert 150, 250, 350, 2170 may include retention features (e.g. first and second apertures 170, 175 of the blank insert 150 of FIGS. 1A-F) formed therein. The first and second apertures 170, 175 are each adapted and configured to receive an identification icon (e.g. identification icon 180, 185 of FIGS. 1C-F). FIGS. 1C-F, 2C-F, 3A-C and the following description include some non-limiting examples of types and sizes of identification icons that may be attached to the blank insert 150, 250, 350, 2170.

As shown in FIGS. 1A-F, for instance, the first aperture 170 is adapted and configured to receive a first identification icon 180, and the second aperture 175 is adapted and configured to receive a second identification icon 185 upon which are disposed various indicia or markings for purposes of identification. The first and second identification icons 180, 185 are sized so that the entire identification icon does not extend beyond the opposing side walls of blank insert 150.

As shown in FIGS. 1E-F, the first identification icon 180 includes a retention tab 181 that extends from the rear facing surface of the identification icon 180. The retention tab 181 assists in holding the identification icon 180 in place when the identification icon 180 is inserted into the blank insert 150. The second identification icon 185 includes a similar retention tab 183 as the retention tab 181 of the first identification icon 180.

In some embodiments, the first identification icon 180 and the second identification icon 185 may be interchangeable. In addition, the first and second identification icons 180, 185 may be removed from the first and second apertures 170, 175 formed in the blank insert 150, and replaced with other identification icons (not shown).

In the embodiment shown in FIGS. 1A-F, the first and second identification icons 180, 185 may be flush with the front facing surface 160 of blank insert 150. However, in alternative embodiments, the first and second identification icons may be received by the first and second apertures of the blank insert, respectively, or another type of retention feature on the blank insert, so that the first and second identification icons are at least partially raised from the front facing surface of the blank insert. In further alternative embodiments, the first and second identification icons may be recessed relative to the front facing surface of the blank insert.

The first and second identification icons 180, 185 allow for additional information, such as marking and indicia, to be provided on the data communication station thereby enhancing the functionality of the blank insert 150. Each of the first and second identification icons 180, 185 may include markings or indicia (e.g. illustration, picture, letter, color, symbol, pattern, number, etc.) for purposes of identification and/or to convey information. In some embodiments, the additional information may supplement the information that may be presented on the data communication station at another location such as, but not limited to, information that may be presented on the connector housing insert or cabling, and may be of use to any number of individuals such as, but not limited to, an end user, an information technology technician, a data communications contractor, etc. In one non-limiting example, the first and second identification icons 180, 185 may include identifying information related to the current use of connectivity interfaces in a data communication station, and/or a future use of a connector housing insert and respective connectivity interface that may replace the blank insert 150. In another non-limiting example, at least one of the first and second identification icons 180, 185 may include identifying information related to the data communication station and/or connectivity interface(s) (e.g. connector(s), port(s), jack(s), outlet(s), and the like) within the station such as, but not limited to, a specific color icon to identify the station as a 10GBASE-T Ethernet station, a phone or computer illustration to identify the purpose of a connectivity interface within the station, the location, and the like. In yet another non-limiting example, at least one of the first and second identification icons 180, 185 may include identifying information related to the data communication station identification within the building, installation use, and/or maintenance information of the data communications infrastructure.

In addition, in the embodiment shown in FIGS. 1A-F, the front facing surface 160 of blank insert 150 includes two apertures 170, 175 formed therein; however, in other embodiments, as is understood by one of ordinary skill in the art, the front facing surface of the blank insert may include any number of apertures formed therein (e.g. one, two, three, four, etc.), each such aperture being configured to receive an identification icon upon which indicia may be disposed as described above.

Furthermore, in the embodiment shown in FIGS. 1A-F, the first and second apertures 170, 175 are generally rectangular-shaped and configured to receive generally rectangular-shaped identification icons 180, 185; however, as is understood by one of ordinary skill in the art, the identification icons 180, 185 may be any suitable size, shape, or orientation, and the corresponding apertures may be configured accordingly. In one non-limiting example, the identification icon may extend beyond the opposing sidewalls of the blank insert and extend across at least some portion of the front facing surface of the blank insert. In another non-limiting example, identification icons may be smaller than the front facing surface of the blank insert, being just large enough to add a color spot, or other such indicator, on the blank insert.

In the embodiment shown in FIGS. 1A-F, the apertures 170, 175 formed in the blank insert are adapted and configured to receive the respective identification icon 180, 185, but it will be understood by one of ordinary skill in the art that the apertures 170, 175 formed therein are only an example of one type of retention feature, and in alternative embodiments, other types of retention features may be included on the blank insert to engage with the respective identification icons, such as but not limited to, the types of retention features shown in FIGS. 4A-C, 5A-H, 6A-I and described below.

Referring to FIGS. 2A-F, an alternate exemplary embodiment of a blank insert 250 and respective identification icons are shown. The blank insert 250 and respective identification icons 280, 285 are substantially similar to the blank insert 150 and respective identification icons 180, 185 illustrated in FIGS. 1A-F and discussed above, except for the following additional features.

The first and second identification icons 280, 285 are larger than the first and second identification icons 180, 185 (see FIG. 1C). More specifically, the first and second identification icons 280, 285 extend across at least a portion of the front facing surface 260 of the blank insert 250. As such, the first and second identification icons 280, 285 are at least partially raised from the front facing surface 260 of the blank insert 250. The larger size of the first and second identification icons 280, 285 permits more indicia (e.g. illustration, picture, letter, color, symbol, pattern, number, etc.) to be marked on the identification icons than the smaller first and second identification icons 180, 185 (see FIG. 1C). Thus, more information may be provided on the data communication station (not shown).

The first and second identification icons 280, 285 may be of any suitable shape, size, or orientation. In some embodiments, the first identification icon 280 and the second identification icon 285 may be interchangeable. In addition, the first identification icon 280 and the second identification icon 285 may be removed from the first and second apertures 270, 275 and replaced with other identification icons having different identification markings or indicia (not shown). In another exemplary embodiment, identification icons of different sizes may be attached to the blank insert 250 of the data communication station. For example, the identification icon 180 (see FIG. 1C) may be attached to the first aperture 270 formed in the blank insert, and the identification icon 285 (see FIG. 2C) may be attached to the second aperture 275 formed in the blank insert.

Figure 3A:
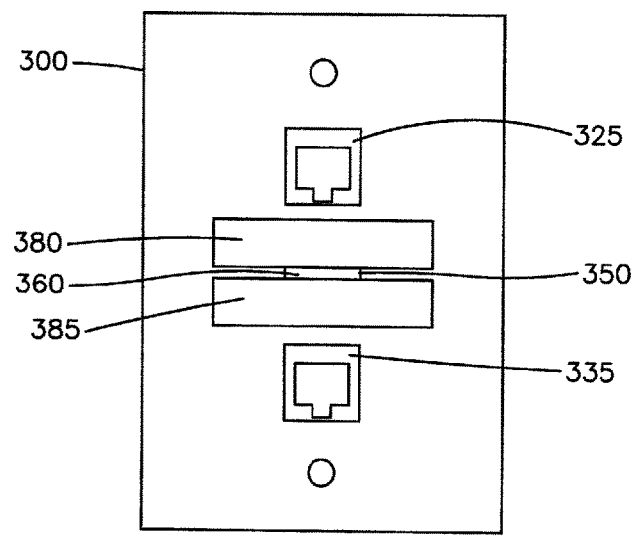
FIG. 3A is another exemplary embodiment of a blank insert, the blank insert having first and second identification icons inserted therein and disposed in a data communications station such as a wall plate.
Figure 3B:
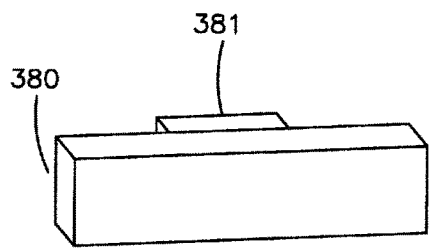
FIG. 3B is a front perspective view of the first identification icon of FIG. 3A including rearward-facing retention tab for insertion into apertures in the blank insert of FIG. 3A.
Figure 3C:
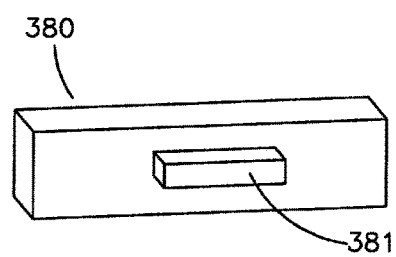
FIG. 3C is a rear perspective view of the first identification icon of FIG. 3B.
Figure 5C:
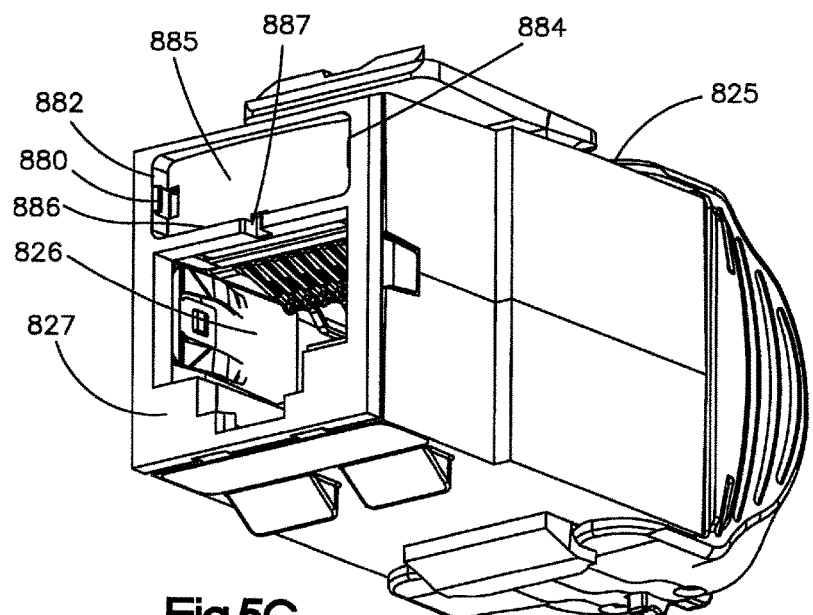
FIG. 5C is a perspective view of the connector housing insert and respective connectivity interface of FIG. 5A having the indicia-bearing identification icon removed.
Figure 5D:
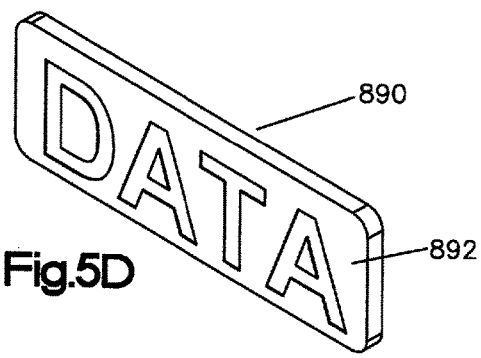
FIG. 5D is a perspective view of the identification icon of FIG. 5A.
Figure 5E:
FIG. 5E is a front view of the identification icon of FIG. 5A.
Figure 5F:
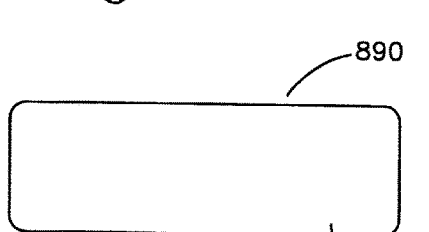
FIG. 5F is a back view of the identification icon of FIG. 5A.
Figure 5G:
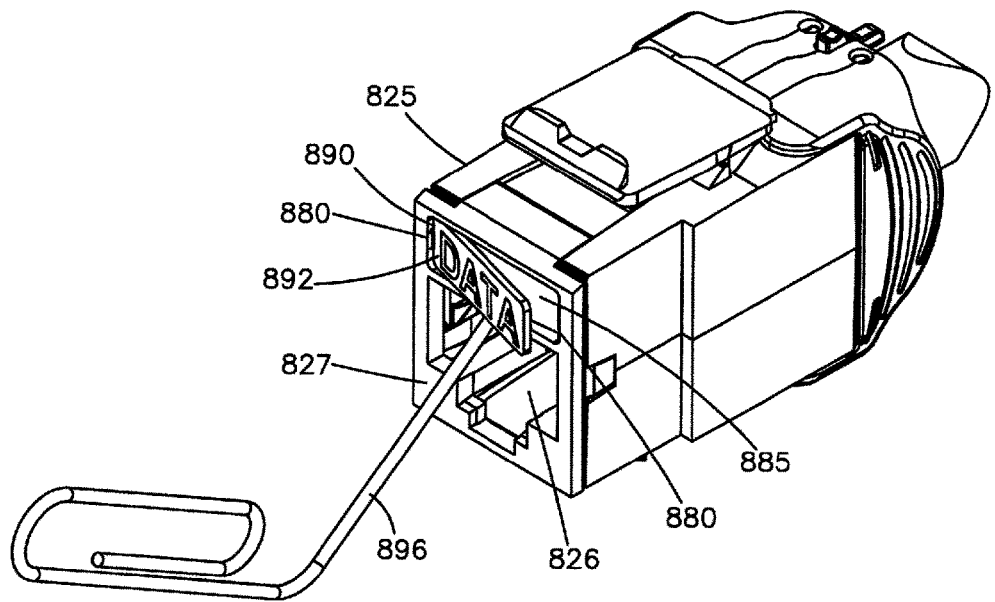
FIG. 5G is a perspective view of the connector housing insert, the respective connectivity interface, and the identification icon of FIG. 5A further including a tool to remove the identification icon from the connector housing insert.
Figure 5H:
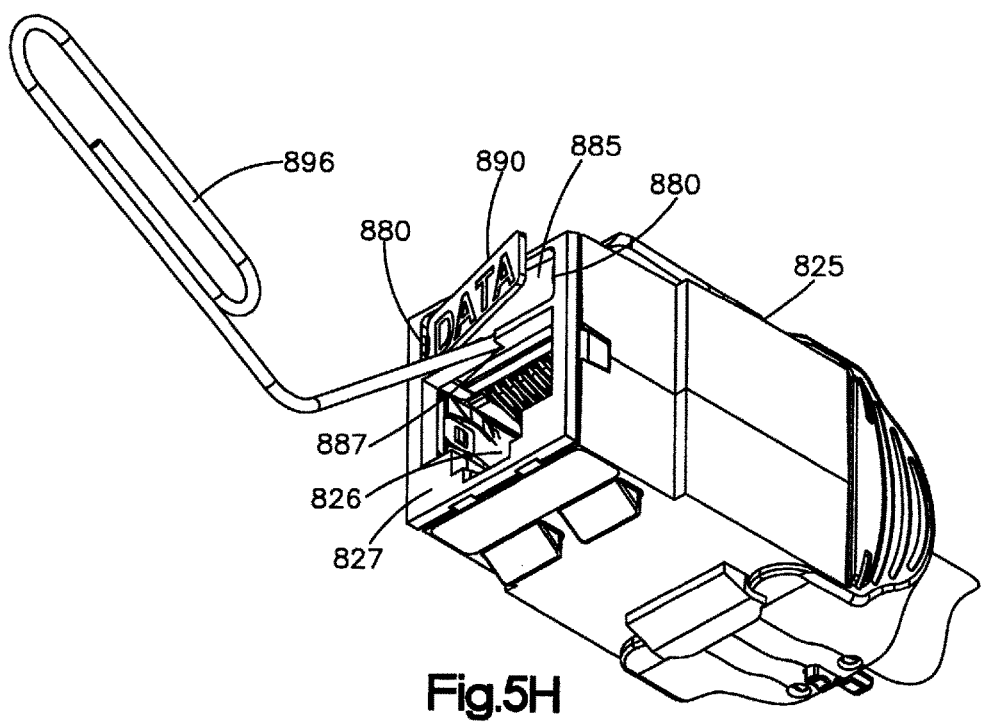
FIG. 5H is a bottom perspective view of FIG. 5G.
Figure 6A:
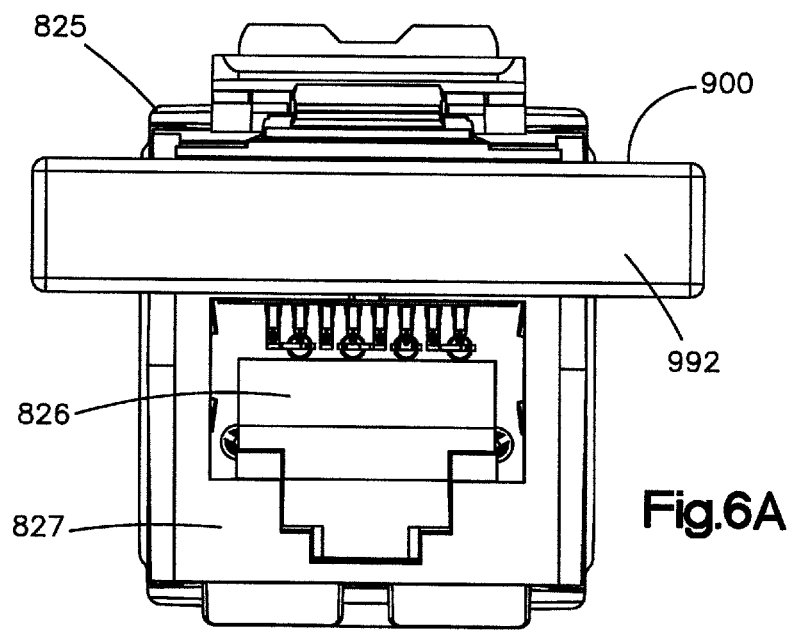
FIG. 6A is another exemplary embodiment of a connector housing insert and respective connectivity interface, the connector housing insert having a recess formed therein configured to receive an identification icon therein.
Figure 6B:
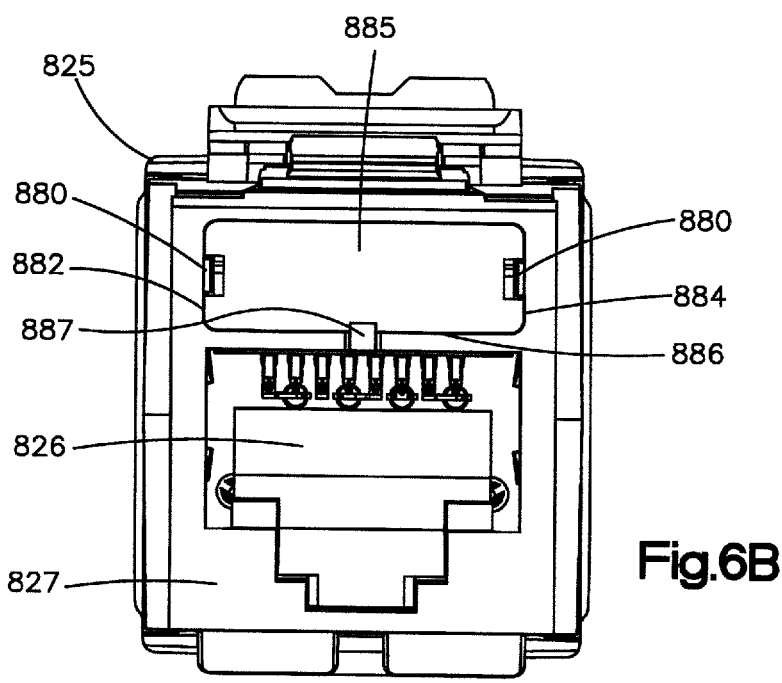
FIG. 6B is a front view of the connector housing insert and respective connectivity interface of FIG. 6A having the identification icon removed.
Figure 6C:
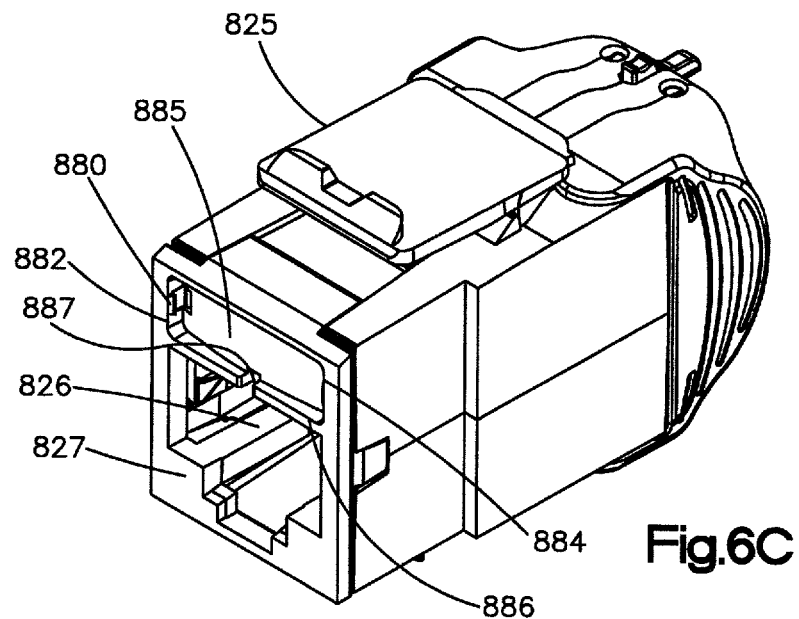
FIG. 6C is a perspective view of the connector housing insert and respective connectivity interface of FIG. 6A having the identification icon removed.
Figure 6D:
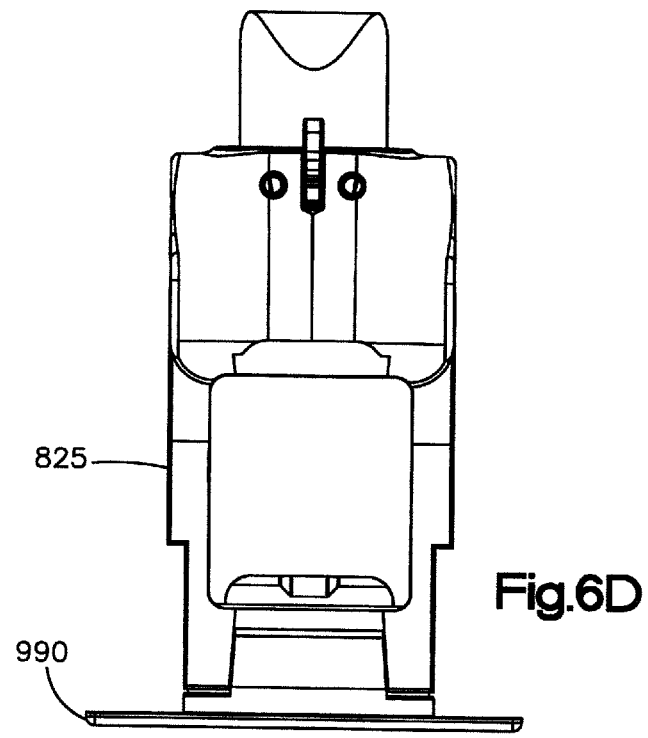
FIG. 6D is a top view of FIG. 6A.
Figure 6E:
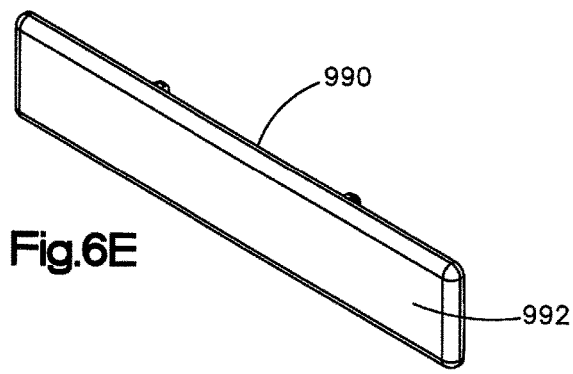
FIG. 6E is a perspective view of the identification icon of FIG. 6A.
Figure 6F:
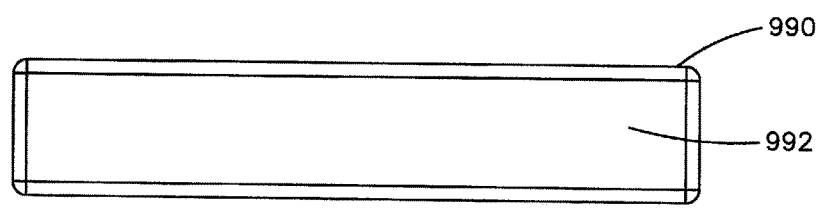
FIG. 6F is a front view of the identification icon of FIG. 6A.
Figure 6G:
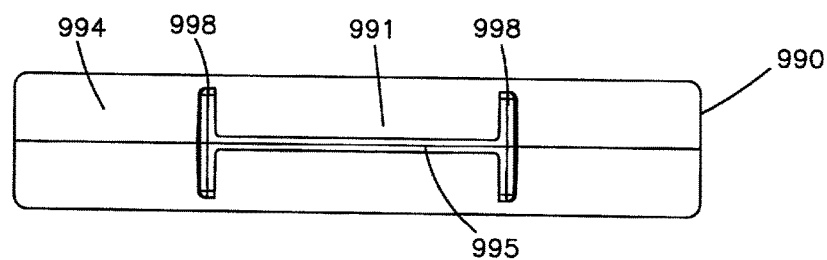
FIG. 6G is a back view of the identification icon of FIG. 6A.
Figure 6H:
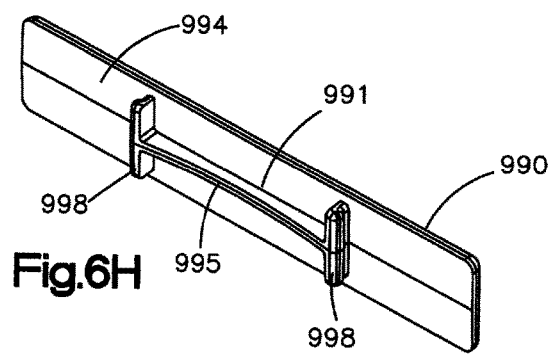
FIG. 6H is a back perspective view of the identification icon of FIG. 6A.
Figure 6I:
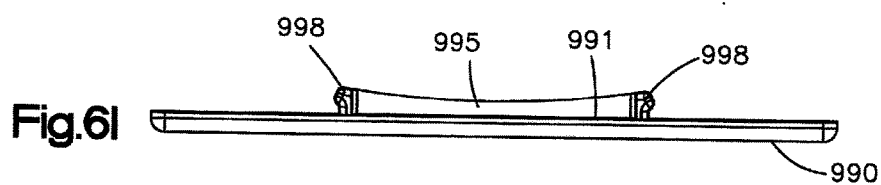
FIG. 6I is a top view of the identification icon of FIG. 6A.

Referring to FIGS. 3A-C, an alternate exemplary embodiment of a blank insert 350 is shown, the blank insert 350 being disposed in a data communication station 300, such as a wall plate. The blank insert 350 is substantially similar to the blank insert 150 illustrated in FIGS. 1A-F and discussed above, but for the following additional features.

Figure 1A:
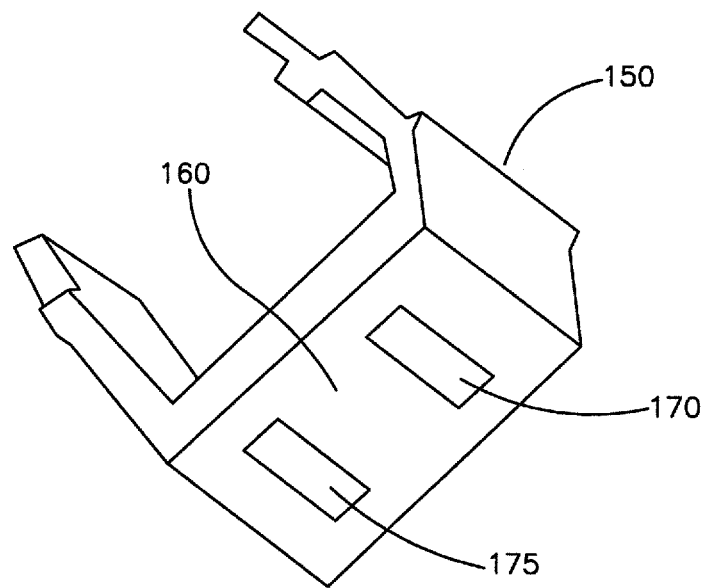
FIG. 1A is an exemplary embodiment of a blank insert having first and second apertures formed therein.
Figure 1B:
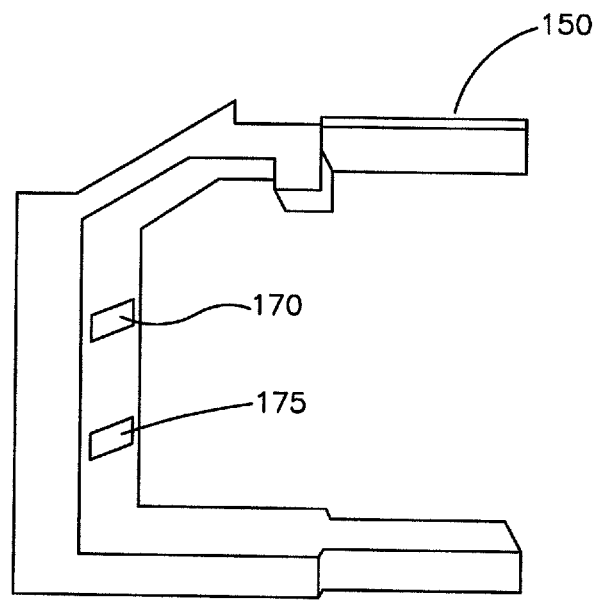
FIG. 1B is a side view of the blank insert of FIG. 1A.
Figure 2A:
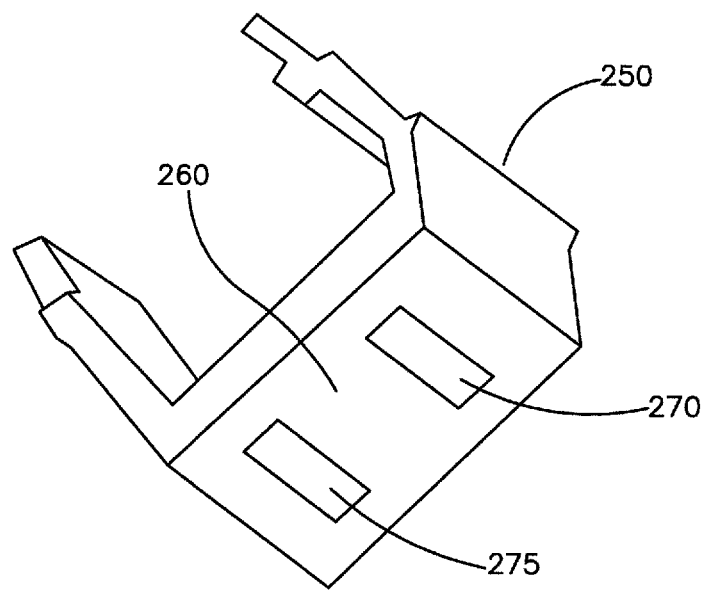
FIG. 2A is another exemplary embodiment of a blank insert having first and second apertures formed therein.
Figure 2B:
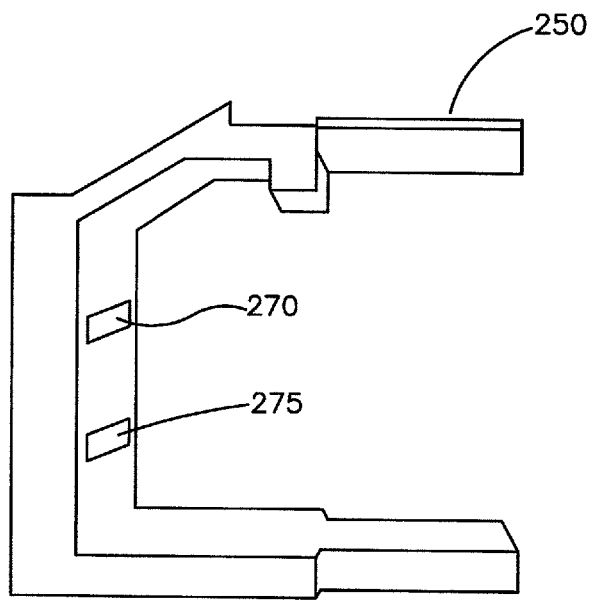
FIG. 2B is a side view of the blank insert of FIG. 2A.
Figure 2C:
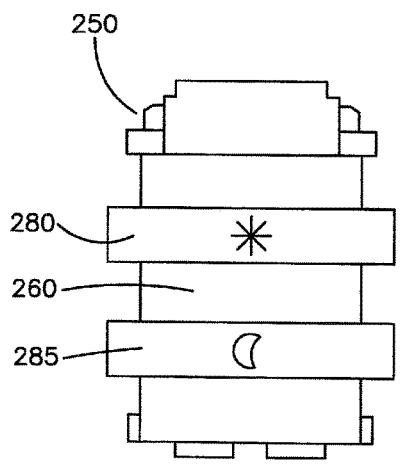
FIG. 2C is a front view of the blank insert of FIG. 2A including first and second identification icons bearing various indicia of connectivity, the first and second identification icons extending across at least a portion of a front facing surface of the blank insert.
Figure 2D:
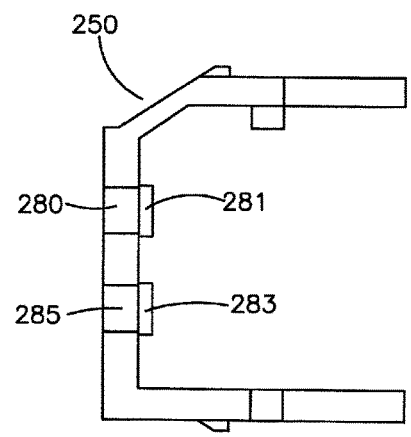
FIG. 2D is a side view of the blank insert of FIG. 2C.
Figure 2E:
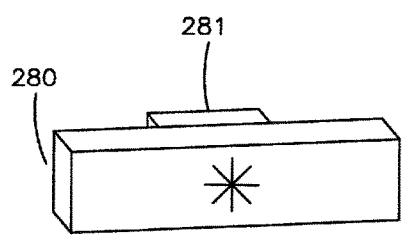
FIG. 2E is a front perspective view of the first identification icon of FIG. 2C, the first identification icon having a rearward-facing retention tab and bearing indicia of connectivity.
Figure 2F:
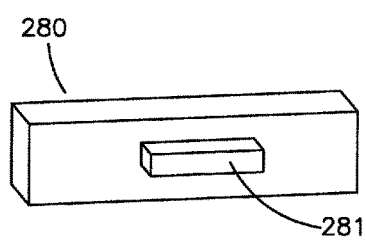
FIG. 2F is a rear perspective view of the first identification icon of FIG. 2E.

The first and second identification icons 380, 385 are larger than the first and second identification icons 180, 185 (see FIG. 1C), and larger than the first and second identification icons 280, 285 (see FIG. 2C). More specifically, the first identification icon 380 extends across and beyond the sides and the top of the front facing surface 360 of the blank insert 350, and the second identification icon 385 extends across and beyond the sides and the bottom of the front facing surface 360 of the blank insert 350. As such, the first and second identification icons 380, 385 are at least partially raised from the front facing surface 360 of the blank insert 350. The larger size of the first and second identification icons 380, 385 allows more markings or indicia (e.g. illustration, picture, letter, color, symbol, pattern, number, etc.) to be marked on the identification icons than the first and second identification icons 180, 185 (see FIG. 1C) and the first and second identification icons 280, 280 (see FIG. 2C). Thus, more information may be provided on the data communication station 300.

The first and second identification icons 380, 385 may be of any suitable shape, size, or orientation. In some embodiments, the first identification icon 380 and the second identification icon 385 may be interchangeable. In addition, the first identification icon 380 and the second identification icon 385 may be removed from the first and second apertures formed in the blank insert 350 and replaced with other identification icons having different identification markings or indicia (not shown). In another exemplary embodiment, identification icons of different sizes may be attached to the blank insert 350 of the data communication station 300. For example, the identification icon 180 (see FIG. 1C) or the identification icon 280 (see FIG. 2C) may be attached to the first aperture formed in the blank insert 350, and the identification icon 385 (see FIG. 3A) may be attached to the second aperture formed in the blank insert 350.

Not only may the identification icons 180, 185, 280, 285, 380, 385 (see FIGS. 1A-F, 2A-F, 3A-C) be adapted and configured to attach to a blank insert, but also the identification icons 180, 185, 280, 285, 380, 385 may be adapted and configured to attach to a connector housing insert such as, but not limited to, the connector housing inserts 725, 825, 2125, 2135 shown in FIGS. 4A-B, 5A-C, 6A-D, 7A. More specifically, as shown in FIGS. 4A-B, a connector housing insert 725 may include a connectivity interface 726 and a retention feature such as an aperture 770 formed therein. The aperture 770 formed in the connector housing insert 725 is adapted and configured to receive any of the identification icons 180, 185, 280, 285, 380, 385 (see FIGS. 1A-F, 2A-F, 3-C). Thus, any of the different-sized identification icons described above in relation to a blank insert, may also be adapted and configured to attach to a connector housing insert (e.g. connector housing insert 725 of FIGS. 4A-B) in substantially the same or similar way as the identification icons attach to the blank inserts.

FIGS. 4A-C show another non-limiting exemplary embodiment of an identification icon 790 that may attach to the connector housing insert 725. The identification icon 790 may include a front facing surface 792 and a back surface 794. The front facing surface 792 is adapted and configured to receive indicia (e.g. illustration, picture, letter, color, words, symbol, pattern, number, etc.). The back surface 794 may include a retention tab 791 that extends from the back surface 794 in a rearward direction, the retention tab 791 being configured to attach the identification icon 790 to the connector housing insert 725. More specifically, the retention tab 791 is adapted and configured to be inserted into the aperture 770 formed in the connector housing insert 725, and be engaged with the connector housing insert 725 by a snap-fit engagement. Similar snap-fit engagement may permit the coupling of the identification icons 180, 185, 280, 285, 380, 385 having retention tabs 181, 281, 381, respectively, as shown in FIGS. 1E-F, 2E-F and 3B-C, respectively, to the aperture 770 formed in the connector housing insert 725. Furthermore, the identification icon 790 may be removed from the connector housing insert 725 and be replaced with another identification icon (not shown).

The identification icons 180, 185, 280, 285, 380, 385 and 790 may be composed of any suitable material. In a preferable embodiment, the identification icons 180, 185, 280, 285, 380, 385 and 790 are plastic. In alternative embodiments, the identification icons may be metal, paper, card stock, a label, etc. The identification icons 180, 185, 280, 285, 380, 385 and 790 may include indicia (e.g. illustration, picture, letter, color, words, symbol, pattern, number, etc.) embedded on the front surface thereof, and/or may be configured to receive markings directly thereon with a pencil, pen, marker, other writing device, print device, such as but not limited to, a printer, label maker, etc. In some embodiments, indicia may be molded into the identification icons 180, 185, 280, 285, 380, 385 and 790. In addition, the identification icons 180, 185, 280, 285, 380, 385 and 790 may be any suitable shape, size, or orientation.

Referring to FIGS. 4A-C, it will be understood by one of ordinary skill in the art that the aperture 770 formed in the connector housing insert 725 is only one type of retention feature which may be used and, in alternative embodiments, other types, shapes and sizes of retention features may be included on the connector housing insert to engage with the respective identification icon.

The identification icon 790 allows for additional information to be provided on the data communication station (such as data communication station 300 shown in FIG. 3A), thereby enhancing the functionality of the connector housing insert 725. The identification icon 790 may include indicia (e.g. illustration, picture, letter, color, words, symbol, pattern, number, etc.) for purposes of identification and/or to convey information. In some embodiments, the additional information may supplement the information that may be presented at another location on the data communication station. Furthermore, the information may be of use to any number of individuals, such as but not limited to, an end user, an information technician, a data communications contractor, etc. In one non-limiting example, the identification icon 790 may include identifying information related to the current use of the connectivity interface 726. In another non-limiting example, the identification icon 790 may include identifying information related to the respective data communication station (e.g. data communication station 300 shown in FIG. 3A). In yet another non-limiting example, the identification icon 790 may include identifying information related to the data communication station, identification within the building, installation use, and/or maintenance of the data communications infrastructure.

In the embodiment shown in FIGS. 4A-C, the front facing surface 727 of the connector housing insert 725 includes one aperture 770 formed therein to receive an identification icon; however, in other embodiments, the connector housing insert may include any number of apertures (e.g. one, two, three, four, etc.) formed therein or other types of retention features, each aperture or other type of retention feature being configured to receive or attach an identification icon.

In addition, in the embodiments shown in FIGS. 4A-C, the identification icon 790 attaches to the connector housing insert 725; however, in other embodiments, the identification icon 790 may be adapted and configured to be inserted into any of the apertures formed in a blank insert, such as but not limited to the apertures 170, 175 formed in the blank insert 150 (see FIGS. 1A-B) and the apertures 270, 275 formed in the blank insert 250 (see FIGS. 2A-B).

FIGS. 5A-H show another non-limiting exemplary embodiment of a connector housing insert 825 and an identification icon 890. The connector housing insert 825 may include a connectivity interface 826, a recess 885 formed therein, and one or more retention features, such as flanges 880. The flanges 880 are adapted and configured to extend from the connector housing insert 825 from opposing sides 882, 884 of the recess 885 formed in the connector housing insert 825. In addition, another side 886 of the recess 885 formed in the connector housing insert 825 may include a slot 887. The recess 885 formed in the connector housing insert 825 is adapted and configured to receive the identification icon 890.

The identification icon 890 may include a front facing surface 892 and a back surface 894. The front facing surface 892 is adapted and configured to receive indicia (e.g. illustration, picture, letter, color, words, symbol, pattern, number, etc.). The identification icon 890 is adapted and configured to be inserted into the recess 885 formed in the connector housing insert 825, and be engaged with the connector housing insert 825 by a snap-fit engagement. More specifically, the flanges 880 of the connector housing insert 825 assist in retaining the identification icon 890 within the recess 885. The identification icon 890 is sized so that the entire identification icon fits within the recess 885.

The identification icon 890 may be removed from the connector housing insert 825 and be replaced with another identification icon (not shown). To disengage the identification icon 890 from the connector housing insert 825, a tool 896, such as but not limited to a paperclip, may be used. That is, a portion of the tool 896 may be inserted into the slot 887 behind the identification icon 890, and push on the back surface 894 of the identification icon 890 to disengage the identification icon 890 from the connector housing insert 825.

Other types of identification icons may engage with the connector housing insert 825. For example, FIGS. 6A-I, shows an alternate exemplary embodiment of an identification icon 990. The identification icon 990 is substantially similar to the identification icon 890 illustrated in FIGS. 5A-H and discussed above, except for the following additional features.

The identification icon 990 is larger than the identification icon 890 (see FIGS. 5A-H). More specifically, the identification icon 990 extends across at least a portion of the front facing surface 827 of the connector housing insert 825. As such, the identification icon 990 is at least partially raised from the front facing surface 827 of the connector housing insert 825. The larger size of the identification icon 990 permits more indicia (e.g. illustration, picture, letter, color, symbol, pattern, number, etc.) to be marked on the front facing surface 992 of the identification icon 990 than the small identification icon 890 (see FIGS. 5A-H). Thus, more information may be provided on the identification icon 990.

The back surface 994 of the identification icon 990 may include a retention tab 991 that extends from the back surface 994 in a rearward direction. The retention tab 991 may include opposing first and second ends 998 having a middle portion 995 disposed therebetween. Furthermore, the retention tab 991 bows inward towards the back surface 994 of the identification icon 990. The retention tab 991 is adapted and configured to be inserted into the recess 885 formed in the connector housing insert 825, and engaged with the connector housing insert 825 by a snap-fit engagement. More specifically, when the identification icon 990 is attached to the connector housing insert 825, the opposing first and second ends 998 of the retention tab 991 fit under the flanges 880 of the connector housing insert 825. As such, the flanges 880 of the connector housing insert 825 engage the opposing first and second ends 998 of the identification icon 990, thereby retaining the retention tab 991 within the recess 885.

The identification icon 890, 990 may be composed of any suitable material. In a preferable embodiment, the identification icon 890, 990 is plastic. In alternative embodiments, the identification icon may be metal, paper, card stock, a label, etc. The identification icon 890, 990 may include indicia (e.g. illustration, picture, letter, color, words, symbol, pattern, number, etc.) embedded on the front surface thereof, and/or may be configured to receive markings directly thereon with a pencil, pen, marker, other writing device, print device, such as but not limited to, a printer, label maker, etc. In some embodiments, indicia may be molded into the identification icon 890, 990. In addition, the identification icon 890, 990 may be any suitable shape, size, or orientation.

Referring to FIGS. 5A-H, 6A-I, it will be understood by one of ordinary skill in the art that the recess 885 and the flanges 880 formed in the connector housing insert 825 are only one type of retention feature which may be used and, in alternative embodiments, other types, shapes and sizes of retention features may be included on the connector housing insert to engage with the respective identification icon.

The identification icon 890, 990 allows for additional information to be provided on the respective data communication station (such as data communication station 300 shown in FIG. 3A), thereby enhancing the functionality of the connector housing insert 825. The identification icon 890, 990 may include indicia (e.g. illustration, picture, letter, color, words, symbol, pattern, number, etc.) for purposes of identification and/or to convey information. In some embodiments, the additional information may supplement the information that may be presented at another location on the data communication station. Furthermore, the information may be of use to any number of individuals, such as but not limited to, an end user, an information technician, a data communications contractor, etc. In one non-limiting example, the identification icon 890, 990 may include identifying information related to the current use of the connectivity interface 826. In another non-limiting example, the identification icon 890, 990 may include identifying information related to the respective data communication station (such as data communication station 300 shown in FIG. 3A). In yet another non-limiting example, the identification icon 890, 990 may include identifying information related to the data communication station identification within the building, installation use, and/or maintenance of the data communications infrastructure.

In the embodiments shown in FIGS. 5A-H, 6A-I, the front facing surface 827 of the connector housing insert 825 includes one recess 885 formed therein; however, in other embodiments, the connector housing insert may include any number of recesses (e.g. one, two, three, four, etc.) formed therein or other types of retention features, each recess or other type of retention feature being configured to receive or attach an identification icon.

In addition, in the embodiments shown in FIGS. 5A-H, 6A-I, the identification icon 890, 990 attaches to the connector housing insert 825; however, in other embodiments, the identification icon 890, 990 may be adapted and configured to be attached to a blank insert.

The identification icon 890, 990 may be of any suitable shape, size, or orientation (see FIGS. 5A-H, 6A-I). In some embodiments, the identification icons 890, 990 may be interchangeable. In addition, the identification icon 890, 990 may be disengaged from the connector housing insert 825 and replaced with another identification icon having different identification markings or indicia (not shown). In another exemplary embodiment, an identification icon of a different size may be attached to the connector housing insert 825.

In some embodiments, the connector housing inserts 325, 335 (see FIG. 3A) may be configured accordingly to retain an identification icon, such as identification icon 790 (see FIG. 4A-C) or identification icon 890, 990 (see FIGS. 5A-H, 6A-I).

It should be understood by those of ordinary skill in the art that the size, shape, and orientation of any of the identification icons described herein may vary based on the type of data communication station, the number of connector housing inserts and/or connectivity interfaces and/or blank inserts in the data communication station, the number of identification icons used in the data communication station, space availability to accommodate the identification icons, application requirements, etc.

It should be understood that those of ordinary skill in the art will recognize that many modifications and substitutions may be made to various elements of the present disclosure. It is envisioned that the features and/or elements described in relation to the exemplary embodiments above are interchangeable, such that one or more features or elements described in one embodiment may be used in combination with one or more features or elements described in another embodiment.

For example, as illustrated in FIGS. 7A-C, a data communication station 2000 may include one or more blank inserts 2170 adapted and configured to receive one or more identification icons (e.g. 2290), as described in detail above; and, the data communication station 2000 may also include one or more connector housing inserts 2125, 2135 adapted and configured to receive one or more other identification icons such as identification icons 180, 185, 280, 285, 380, 385, 790, 890 and 990 (see FIGS. 1C-F, 2C-F, 3A-C, 4A-C, 5A-H, 6A-I) described in detail above.

Furthermore, the data communication station 2000 may include one or more identification icons 2300, 2400 that may be inserted and attached directly to a wall plate 2010. As such, each of the one or more identification icons 2300, 2400 is adapted and configured to be in registered alignment with an aperture or apertures formed in the wall plate 2010. More specifically, retention tabs 2310 disposed at the rear surface of identification icons 2300, 2400 may be used to attach the identification icons 2300, 2400 to the wall plate 2010, as shown in FIGS. 7A-C.

Alternatively, identification icons 2300, 2400 may be structurally similar to identification icons 180, 185, 280, 285, 380, 385, 790, 890 and 990 (see FIGS. 1C-F, 2C-F, 3A-C, 4A-C, 5A-H, 6A-I) with retention tabs extending from the rearward surface. Alternatively, identification icons 2300, 2400 may be sufficiently large in size to be comprised of a transparent front window portion or cover 2320 behind which is an inserted label insert 2330 (e.g. a strip of paper or plastic) upon which may be disposed markings or indicia. In such embodiment, identification icons 2300, 2400 may include various forms of retention tabs 2310 at opposing ends or elsewhere that extend rearward and are configured to be received by apertures in the front face of wall plate 2010.

Similarly, as size permits, identification icons 180, 185, 280, 285, 380, 385, 790, 890 and 990 (see FIGS. 1C-F, 2C-F, 3A-C, 4A-C, 5A-H, 6A-I) may be comprised of a transparent window or cover, similar to window or cover 2320, and configured to receive an insertable label, such as label insert 2330, and upon which informative or identifying markings or indicia may be printed or disposed. The identification icons 2300, 2400 may be any suitable shape, size, or orientation.

In the exemplary embodiments shown in FIGS. 3A, 4A-B, 5A-H, 6A-D, 7A, the connector housing inserts each include a connectivity interface, the connectivity interface configured to receive an RJ-45 connector. However, in alternative embodiments, the connectivity interface may be used to receive other connectors, including but not limited to, other registered jacks (e.g. RJ-11, etc.), various category connectors (e.g. Category 6, Category 6A), S-Video adapters, F-Connectors, binding post connectors, banana jack connectors, stereo adapters, RCA connectors, BNC connectors, shielded connectors, USB, HDMI, DisplayPort and any other such connectors now or hereafter known.

In some of the exemplary embodiments described above, such as those illustrated in FIGS. 3A and 7A, wall plates are shown to receive various inserts. However, it will be understood by one of ordinary skill in the art that other types of data communication stations, such as wall plates, patch panels, patch blocks etc., variously configured to receive other types and shapes of inserts may be used. In addition, the respective data communication stations may include any number of apertures formed therein, and the apertures formed in the respective data communication stations may be arranged in various configurations.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A data communication station comprising:
  a. a frame including a connectivity interface, the connectivity interface having an aperture formed therein;
  b. a blank insert including a front facing surface and a retention feature on the front facing surface, the blank insert inserted in the aperture formed in the connectivity interface; and
  c. an identification icon attached to the retention feature on the front facing surface of the blank insert, wherein the identification icon receives indicia thereon,
  wherein the retention feature is an aperture formed in the front facing surface of the blank insert, and the identification icon is inserted into the aperture formed in the front facing surface of the blank insert.

2. The data communication station of claim 1 further comprising a second identification icon, wherein the front facing surface of the blank insert includes an additional aperture formed therein, and wherein the second identification icon is inserted in the additional aperture.

3. The data communication station of claim 1, wherein the frame is a wall plate.

4. The data communication station of claim 1, wherein the indicia on the identification icon includes identifying information related to a potential type of connector that may replace the blank insert.

5. The data communication station of claim 1, wherein the identification icon is generally flush with the blank insert.

6. The data communication station of claim 1, wherein the identification icon extends beyond at least a portion of the front facing surface of the blank insert.

7. The data communication station of claim 1 further comprising a connector housing insert inserted into the frame, wherein the indicia on the identification icon includes identifying information related to the connector housing insert.

8. The data communication station of claim 1, wherein the identification icon further includes a front surface and a back surface, wherein the front surface receives the indicia thereon, and wherein a prong extends from the back surface of the identification icon, the prong being inserted into the aperture formed in the front facing surface of the blank insert.

9. The data communication station of claim 8, wherein the identification icon further includes a cover and a label insert, wherein the label insert receives the indicia thereon.

10. The data communication station of claim 1 further comprising an additional identification icon to receive indicia thereon, wherein the identification icon is detached from the retention feature, and wherein the additional identification icon attaches to the retention feature.

* * * * *